(12) United States Patent
Matsuo et al.

(10) Patent No.: US 6,809,137 B2
(45) Date of Patent: Oct. 26, 2004

(54) RUBBER COMPOSITION AND PNEUMATIC TIRE USING SAID RUBBER COMPOSITION

(75) Inventors: Kenji Matsuo, Tokyo (JP); Masahiro Hojo, Tokyo (JP); Tomohisa Nishikawa, Tokyo (JP); Kazuomi Kobayashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/326,691

(22) Filed: Jun. 7, 1999

(65) Prior Publication Data

US 2003/0130392 A1 Jul. 10, 2003

(30) Foreign Application Priority Data

Jun. 8, 1998 (JP) .......................................... 10-159512

(51) Int. Cl.[7] ................................................. C08K 5/36
(52) U.S. Cl. ...................... 524/282; 524/283; 524/306; 524/345
(58) Field of Search ................................ 524/282, 283, 524/306, 345

(56) References Cited

U.S. PATENT DOCUMENTS

| | | | |
|---|---|---|---|
| 3,528,936 A | 9/1970 | Kent et al. | ................ 260/23.7 |
| 5,736,611 A | 4/1998 | Blok et al. | ................ 525/305 |

FOREIGN PATENT DOCUMENTS

| | | |
|---|---|---|
| EP | 0 070 143 A | 1/1983 |
| JP | 53-64254 | 11/1976 |
| JP | 56-55343 | 5/1981 |
| JP | 58-5348 | 1/1983 |
| JP | 59-96106 | 6/1984 |
| JP | 60-94407 | 5/1985 |
| JP | 58-185646 | 10/1986 |
| JP | 62-253643 | 11/1987 |
| JP | 63-108043 | 5/1988 |
| JP | 63-112648 | 5/1988 |
| JP | 63-199744 | 8/1988 |
| JP | 63-301242 | 12/1988 |
| JP | 4-15238 | 1/1992 |
| JP | 4-99762 | 3/1992 |
| JP | 7-33914 | 2/1995 |
| JP | 9-132677 | 5/1997 |
| JP | 10-195237 A | 7/1998 |
| JP | 10-231389 | 9/1998 |
| JP | 11-181153 | 7/1999 |
| JP | 11-189679 | 7/1999 |

OTHER PUBLICATIONS

JP 09 151279A (abstract), Jun. 10, 1997 (AN 1997–359191 XP002139484, Derwent Publications Ltd.)

Primary Examiner—Peter D. Mulcahy
(74) Attorney, Agent, or Firm—Sughrue Mion, PLLC

(57) ABSTRACT

A rubber composition having excellent heat resistance and a pneumatic tire produced by using this rubber composition are provided.

The rubber composition has, in a curve exhibiting a change in dynamic storage modulus during elevation of temperature, an intersection of an extrapolation line of a portion in which the dynamic storage modulus is approximately constant before rapidly decreasing at temperatures higher than 100° C. and an extrapolation line of a portion in which the dynamic storage modulus rapidly decreases, at a temperature of 170° C. or higher.

9 Claims, 2 Drawing Sheets

RUBBER COMPOSITION AND PNEUMATIC TIRE USING SAID RUBBER COMPOSITION

BACKGROUND OF THE INVENTION

1. Field of the Invention

The present invention relates to a rubber composition and a pneumatic tire and, more particularly, to a rubber composition having improved heat resistance and a pneumatic tire using said rubber composition.

2. Description of the Related Art

Heretofore, a reinforcing layer composed of a rubber composition alone or a composite of a rubber composition and another material such as a fiber is disposed at side wall portions of a pneumatic tire to enhance the rigidity of the side wall portions. However, when the temperature of the rubber composition increases to 200° C. or higher, for example, in use of the pneumatic tire in a condition in which the pressure inside the pneumatic tire (hereinafter referred to as the inner pressure) is reduced by a puncture or the like, i.e., in a run-flat condition, the rubber composition tends to show rupture of crosslinked portions obtained by vulcanization or of the polymer itself forming the rubber component. Due to an increase in deformation of the caused by a decrease in modulus side wall portion, heat generation of the rubber composition is accelerated and/or the limit of failure of the rubber lowers. As the result, the tire is damaged in a relatively short time.

To increase the time before the tire is damaged to as long as possible, the modulus of the rubber composition may be increased as much as possible by modifying the formulation of the rubber composition or the heat generation in the rubber composition itself may be suppressed by decreasing tan δ of the rubber composition as much as possible by modifying the formulation of the rubber composition. However, improvement by modifying the formulation has limit. Further, when the amounts of rubber reinforcing layers and/or bead fillers are increased to ensure durability of a desired level or higher, ride comfort under normal running condition and noise level deteriorate and the weight of the tire increases.

SUMMARY OF THE INVENTION

An object of the present invention is to provide a rubber composition having improved heat resistance and a pneumatic tire produced using this rubber composition, more particularly, a pneumatic tire exhibiting improved durability using this rubber composition as a rubber composition for side wall reinforcing layer and/or a rubber composition for bead portion reinforcing rubber filler As the result of intensive studies by the present inventors on various chemicals used in formulations to improve heat resistance of the rubber composition, it was found that the heat resistance of a rubber composition can be remarkably improved when specific compounds are used in the formulation. The present invention has been completed on the basis of this knowledge.

The object of the present invention can be achieved in accordance with (1) to (18) described in the following.

(1) A rubber composition having, in a curve exhibiting a change in dynamic storage modulus during elevation of temperature, an intersection of an extrapolation line A of a portion in which the dynamic storage modulus shows an approximately linear change before a rapid decrease at temperatures higher than 100° C. and an extrapolation line B of a portion in which the dynamic storage modulus rapidly decreases, at a temperature of 170° C. or higher.

(2) A rubber composition described in (1), which comprises sodium 1,6-hexamethylenedithiosulfate dihydrate.

(3) A rubber composition described in any of (1) and (2), wherein the amount of sodium 1,6-hexamethylenedithiosulfate dihydrate is 1 to 10 parts by weight per 100 parts by weight of a rubber component.

(4) A rubber composition described in any of (1) to (3), which comprises a compound A having two or more ester groups in one molecule.

(5) A rubber composition having, in a curve exhibiting a change in dynamic storage modulus during elevation of temperature, a difference ΔE' between the maximum value and the minimum value of the dynamic storage modulus at a temperature between 180 and 200° C. of 2.5 MPa or less.

(6) A rubber composition described in (5), which comprises a compound A having two or more ester groups in one molecule.

(7) A rubber composition described in any of (4) and (6), wherein the compound A is an acrylate or a methacrylate.

(8) A rubber composition described in any of (4), (6) and (7), wherein the compound A is a polyfunctional ester of a polyhydric alcohol and acrylic acid or methacrylic acid.

(9) A rubber composition described in any of (4), and (6) to (8), wherein the polyhydric alcohol forming the compound A is at least one compound selected from the group consisting of tetramethylolmethane, trimethylolpropane and polymers of these compounds.

(10) A rubber composition described in any of (4), and (6) to (9), wherein the polyhydric alcohol is trimethylolpropane or a dimer of tetramethylolmethane.

(11) A rubber composition described in any of (4), and (6) to (10), wherein the amount of the compound A is 0.5 to 20 parts by weight per 100 parts by weight of a rubber component.

(12) A pneumatic tire comprising side wall portions reinforced with a rubber reinforcing layer, wherein a rubber composition for the rubber reinforcing layer comprises the rubber composition described in any of (1) to (11).

(13) A pneumatic tire comprising bead fillers for which the rubber composition described in any of (1) to (11) is used.

(14) A pneumatic tire described in any of (12) and (13), which is a run-flat tire.

(15) A rubber composition for side reinforcing layers and/or bead fillers comprising sodium 1,6-hexamethylenedithiosulfate dihydrate.

(16) A rubber composition described in (15), which comprises a compound A having two or more ester groups in one molecule.

(17) A rubber composition for side reinforcing layers and/or bead fillers which comprises a compound A having two or more ester groups in one molecule.

(18) Use of sodium 1,6-hexamethylenedithiosulfate dihydrate in side reinforcing layers and/or bead fillers of a pneumatic tire.

DESCRIPTION OF THE PREFERRED EMBODIMENTS

The rubber composition has, in a curve exhibiting the change in dynamic storage modulus E' during elevation of temperature, the intersection of extrapolation line A of a portion in which the dynamic storage modulus shows an approximately linear change before a rapid decrease at temperatures higher than 100° C. and extrapolation line B of a portion in which the dynamic storage modulus rapidly decreases, at a temperature of 170° C. or higher.

Figure 3:
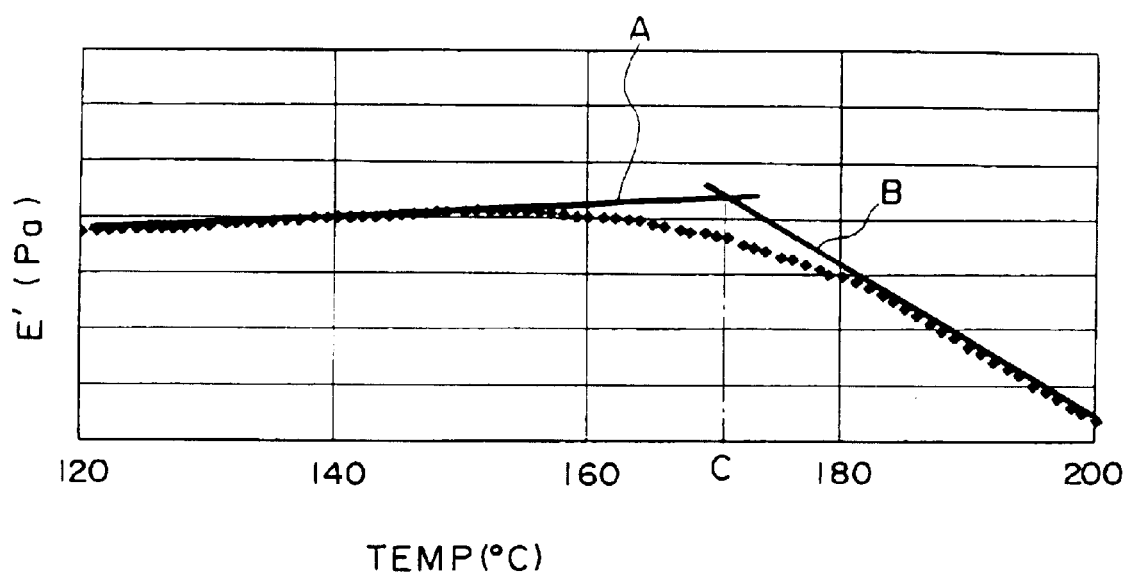
FIG. 3 shows a diagram exhibiting, in the curve exhibiting a change in dynamic storage modulus during elevation of temperature, temperature C at an intersection of extrapolation line A of a portion in which the dynamic storage modulus shows an approximately linear change before rapidly decreasing at temperatures higher than 100° C. and extrapolation line B of a portion in which the dynamic storage modulus rapidly decreases.

In the curve exhibiting the change in dynamic storage modulus E' during elevation of temperature, the temperature at the intersection of extrapolation line A of a portion in which the dynamic storage modulus shows an approximately linear change before a rapid decrease at temperatures higher than 100° C. and extrapolation line B of a portion in which the dynamic storage modulus rapidly decreases is temperature C shown in FIG. 3.

When the temperature at the intersection is lower than 170° C., durability of the rubber composition at the high temperatures caused by heat generated in the run-flat condition is not sufficient. Therefore, the temperature must be 170° C. or higher.

Extrapolation line A is a line obtained by extrapolation of the portion in which the dynamic modulus shows an approximately linear change before a rapid decrease at temperatures higher than 100° C. in the curve exhibiting the change in dynamic storage modulus during elevation of temperature. It is preferable that extrapolation line A contacts the curve showing the change in dynamic storage modulus in a range of 40° C. and more preferably in a range of 20° C.

Extrapolation line B is a line obtained by extrapolation of the portion in which the dynamic modulus rapidly decreases. It is preferable that extrapolation line B contacts the curve showing the change in dynamic storage modulus in a range of 15° C. and more preferably in a range of 10° C.

In the present invention, it is preferable that sodium 1,6-hexamethylenedithiosulfate dihydrate is used as an agent to prevent heat aging. Sodium 1,6-hexamethylenedithiosulfate dihydrate suppresses rupture of chains of the polymer constituting the rubber component. Therefore, in the curve exhibiting the change in dynamic storage modulus during elevation of temperature, the intersection of the extrapolation line A of the portion in which the dynamic modulus shows an approximately linear change before a rapid decrease at temperatures higher than 100° C. and the extrapolation line B of the portion in which the dynamic modulus rapidly decreases can be easily brought to a temperature of 170° C. or higher.

The amount of sodium 1,6-hexamethylenedithiosulfate dihydrate is not particularly limited. From the standpoint of achieving the object of the present invention, it is preferable that the amount is in the range of 1 to 10 parts by weight per 100 parts by weight of the rubber component.

In the present invention, the rubber composition may further comprise a compound having two or more ester groups in one molecule as an agent for preventing degradation.

The agent for preventing degradation preferably used in the present invention is substantially inert during vulcanization at a temperature lower than 170° C. Therefore, the agent for preventing degradation does not take part in the crosslinking at the temperature of vulcanization (generally about 160° C.) and modulus does not increase to a value higher than the prescribed value. When the temperature of the rubber composition is 170° C. or higher, degradation of the rubber begins to take place and rupture of crosslinking points and/or polymer chains occurs. However, re-crosslinking of the polymer chains with the agent for preventing degradation proceeds at the same time and the decrease in modulus can be suppressed. As the result, heat generation can be suppressed even at high temperatures.

The compound having two or more ester groups in one molecule is not particularly limited. An acrylate or a methacrylate is preferable and a polyfunctional ester formed from a polyhydric alcohol and acrylic acid or methacrylic acid is more preferable.

Examples of the polyhydric alcohol include alkylene glycols such as methylene glycol, ethylene glycol, propylene glycol, butylene glycol, pentanediol and hexanediol; polymers of alkylene glycols; compounds obtained by introducing methylol groups into the above mentioned alkylene glycols and polymers of alkylene glycols; ketoroses such as erythritol; compounds having polyalkylene oxide groups such as polyalkoxyphenylpropanes; and polyesters and oligoesters having two or more alcoholic hydroxyl groups. Among these compounds, compounds obtained by introducing methylol groups into the above mentioned alkylene glycols and polymers thereof are preferable.

Specific examples of the compounds having two or more ester groups in one molecule include 1,3-butylene glycol diacrylate, 1,5-pentanediol diacrylate, neopentyl glycol diacrylate, 1,6-hexanediol diacrylate, diethylene glycol diacrylate, triethylene glycol diacrylate, tetraethylene glycol diacrylate, polyethylene glycol diacrylate, polypropylene glycol diacrylate, bis(4-acryloxy)polyethoxyphenylpropane oligoester diacrylate, pentaerythritol triacrylate, trimethylolpropane triacrylate, tetramethylolmethane tetraacrylate, dipentaerythritol hexaacrylate, dipentaerythritol pentaacrylate, oligoester polyacrylate, dipropylene glycol dimethacrylate, trimethylolethane trimethacrylate, trimethylolpropane trimethacrylate, di(tetramethylolmethane) pentamethacrylate and di(tetramethylolmethane) trimethacrylate. Among these compounds, di(tetramethylolmethane) pentamethacryalte, di(tetramethylolmethane) trimethacrylate and trimethylolpropane trimethacrylate are preferable. A single type or a mixture of two or more types of the above compounds may be used.

The amount of the compound having two or more ester groups in one molecule is preferably 0.5 to 20 parts by weight and more preferably 1.0 to 15 parts by weight per 100 parts by weight of the rubber component.

In the rubber composition of the present invention, rupture of polymer chains can be suppressed by the agent for preventing heat aging. Even when rupture of polymer chains takes place, the broken polymer chains are reconstructed by the agent for preventing degradation and the change in dynamic storage modulus of the rubber composition in the temperature range of 170 to 200° C. can be suppressed to 3 MPa or less. In particular, the rubber composition comprising the agent for preventing degradation of the present invention preferably have a difference ΔE' between the maximum value and the minimum value of the dynamic storage modulus at a temperature between 180 and 200° C. of 2.5 MPa or less.

The rubber component used in the present invention is not particularly limited and can be suitably selected from generally used rubber components. Examples of the rubber component include natural rubber (NR), synthetic polyisoprene (IR), polybutadiene (BR), styrene-butadiene copolymers (SBR), butyl rubber (IIR) and ethylene-propylenediene copolymers (EPDM). A single type or a blend of two or more types of the above rubber components may be used.

The rubber composition of the present invention may further comprise suitable compounding ingredients generally used in the rubber industry such as crosslinking agents, crosslinking accelerators, antioxidants, softeners, reinforcing fillers and inorganic fillers. The rubber composition of the present invention may also be used as a composite together with particles, fibers, cloths and the like made of various materials.

In the pneumatic tire of the present invention, bead fillers and/or rubber reinforcing layers disposed in the side wall portions may preferably comprise the above rubber composition.

The pneumatic tire, particularly the bead filler and the side wall portion of the pneumatic tire, will be briefly described with reference to FIG. 1.

Figure 1:
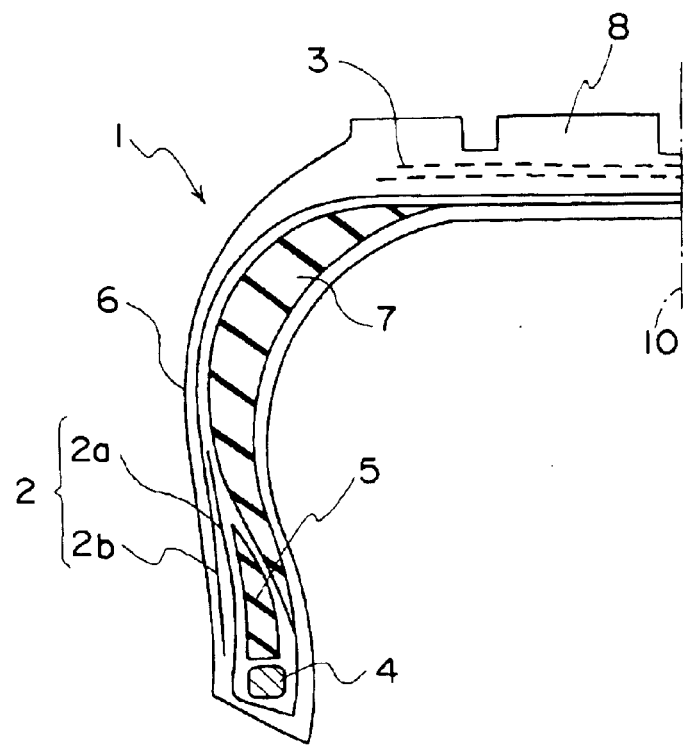
FIG. 1 shows a cross-sectional view of an example of the pneumatic tire of the present invention.
Figure 2:
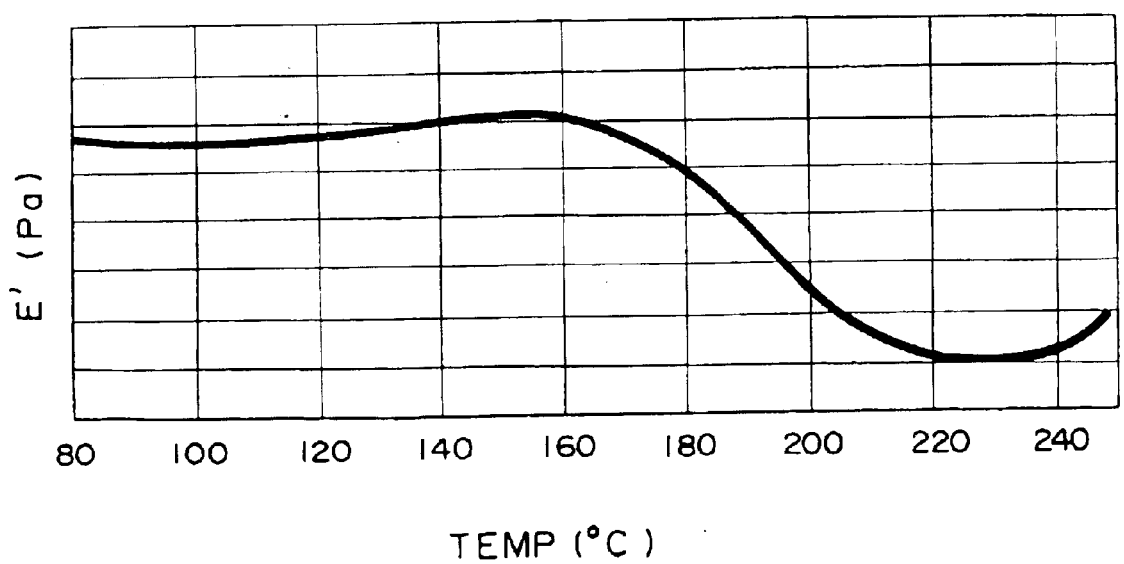
FIG. 2 shows a curve exhibiting the change in dynamic storage modulus during elevation of temperature.

FIG. 1 shows a cross-sectional view of an example of the pneumatic tire. A carcass 2 has a turned-up carcass ply 2a and a down carcass ply 2b, which have reinforcing cords, disposed in the direction approximately perpendicular to a plane 10. Two layers of belts 3 (steel belts) are disposed on the carcass plies in the radial direction of the tire. A tread rubber 8 is disposed on the belts 3 at the surface portion of the tire which contacts road surfaces. Side wall portions 6 are disposed at both sides of the tread rubber 8 on the carcass ply 2.

Both end portions of the turned-up carcass ply 2 are turned-up around bead cores 4 to form turned-up end portions. Bead fillers 5 made of a hard rubber are disposed between the carcass ply 2 and the turned-up end portions thereof at the outside of the bead cores 4 in the radial direction of the tire. The down carcass ply 2b is disposed extending between the side wall portions 6 and the turned-up end portions of the turned-up carcass ply 2a. Rubber reinforcing layers 7 having a crescent-shaped cross section are disposed at the inner circumferential surface of the side walls portion of the turned-up carcass ply 2a.

It is preferable that at least one of the rubber composition for the bead filler and for the rubber reinforcing layer comprises sodium 1,6-hexamethylenedithiosulfate dihydrate. It is more preferable that the rubber composition for the bead filler further comprises a compound having two or more ester groups in one molecule. The rubber composition for the bead filler and/or the rubber reinforcing layer preferably has a dynamic storage modulus E' of 8 MPa or more at 160° C., more preferably 10 MPa or more at 160° C. and most preferably 13 MPa or more at 160° C.

The best tire durability may be obtained when both of the rubber members comprise the above described rubber composition.

When conventional pneumatic tires are used in a condition of a markedly reduced inner pressure (in the so-called run-flat condition), deformation of the tire caused by the load markedly increases. Heat generation caused by the deformation increases particularly markedly at side wall portions and damage occurs in the side wall portions. This problem of conventional tires can be overcome by the pneumatic tire comprising the above rubber composition.

Thus, durability of the tire side wall portions can be particularly improved by using the compound described in the present invention in the rubber compositions for the tire and preferably in the rubber compositions for the rubber reinforcing layer of the side wall portions and/or the bead fillers. As the result, for example, the driving distance in the run-flat condition can be remarkably increased. In other words, the present invention can be effectively applied to the run-flat tire which particularly emphasizes safety in the run-flat condition.

EXAMPLES

The present invention will be described specifically with reference to examples in the following. However, the present invention is not limited by the examples.

In the examples, part and % mean part by weight and % by weight unless otherwise mentioned.

Various measurements were made in accordance with the following methods.

(1) Viscoelastic Characteristics of a Rubber Composition

A slab sheet having a thickness of 2 mm was prepared by vulcanization at 160° C. for 12 minutes and a sample having a width of 5 mm and a length of 20 mm was cut out from the slab sheet. Dynamic storage modulus (E') of the sample was measured using SPECTROMETER manufactured by TOYO SEIKI Co., Ltd. at an initial load of 160 g under a dynamic strain of 1% at a frequency of 52 Hz while the temperature was raised from 20 to 250° C. at a rate of 3° C./second.

(2) Durability of a Tire in the Run-Flat Condition

A tire inflated with an inner pressure of 3.0 kg/cm$^2$ was fitted to a rim. After the tire was left standing at a room temperature of 38° C. for 24 hours, the pressure inside the tire was set to the atmospheric pressure by removing the valve core. Then, the tire was subjected to the drum test under a load of 570 kg at a speed of 89 km/hour at a temperature of 38° C. The distance driven before trouble occurred was taken as durability in the run-flat condition. Durabilities in the run-flat condition in the Examples are expressed as indices relative to the durability of the control tire in Comparative Example 1 which is set at the value of 100. The greater the index, the better the durability in the run-flat condition.

Examples 1–18

Rubber compositions were prepared in accordance with the formulations shown in Table 1 and the dynamic storage modulus E' was measured with an elevation of temperature. The results are shown in Table 1.

TABLE 1-1

| Example Comparative Example | 1 | 1 | 2 | 3 | 4 | 5 | 6 |
|---|---|---|---|---|---|---|---|
| Natural rubber | 30.0 | 30.0 | 30.0 | 30.0 | 30.0 | 30.0 | 30.0 |
| Butadiene rubber[*1] | 70.0 | 70.0 | 70.0 | 70.0 | 70.0 | 70.0 | 70.0 |
| Carbon black[*2] | 60.0 | 60.0 | 60.0 | 60.0 | 60.0 | 60.0 | 70.0 |
| Softener[*3] | 5.0 | 5.0 | 5.0 | 5.0 | 5.0 | 5.0 | 5.0 |
| Zinc oxide | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 |

TABLE 1-1-continued

| | Example | Comparative Example | | | | | |
|---|---|---|---|---|---|---|---|
| | 1 | 1 | 2 | 3 | 4 | 5 | 6 |
| Antioxidant*4 | 2.0 | 2.0 | 2.0 | 2.0 | 2.0 | 2.0 | 2.0 |
| Vulcanization accelerator*5 | 3.5 | 3.5 | 3.5 | 3.5 | 3.5 | 3.5 | 3.5 |
| Agent for preventing heat aging*6 | 0.0 | 1.0 | 2.0 | 3.0 | 5.0 | 10.0 | 3.0 |
| Agent for preventing degradation*7 | 0.0 | 0.0 | 0.0 | 0.0 | 0.0 | 0.0 | 0.0 |
| Sulfur | 5.0 | 5.0 | 5.0 | 5.0 | 5.0 | 5.0 | 5.0 |
| Temperature C (° C.) | 169 | 174 | 176 | 178 | 180 | 181 | 178 |
| ΔE'*8(MPa) | 3.0 | 3.0 | 3.0 | 3.0 | 3.0 | 3.0 | 3.0 |
| Applied portion | | | | | | | |
| reinforcing rubber | applied | applied | applied | applied | applied | applied | applied |
| bead filler | not applied | not applied | not applied | not applied | not applied | not applied | not applied |
| Durability in the run-flat condition | 100 | 105 | 110 | 123 | 132 | 140 | 125 |

TABLE 1-2

| Example | 7 | 8 | 9 | 10 | 11 | 12 |
|---|---|---|---|---|---|---|
| Natural rubber | 30.0 | 30.0 | 30.0 | 50.0 | 70.0 | 30.0 |
| Butadiene rubber*1 | 70.0 | 70.0 | 70.0 | 50.0 | 30.0 | 70.0 |
| Carbon black*2 | 50.0 | 40.0 | 30.0 | 60.0 | 60.0 | 60.0 |
| Softener*3 | 5.0 | 5.0 | 5.0 | 5.0 | 5.0 | 5.0 |
| Zinc oxide | 3.0 | 3.0 | 3.0 | 3.0 | 3.0 | 3.0 |
| Stearic acid | 1.0 | 1.0 | 1.0 | 1.0 | 1.0 | 1.0 |
| Antioxidant*4 | 2.0 | 2.0 | 2.0 | 2.0 | 2.0 | 2.0 |
| Vulcanization accelerator*5 | 3.5 | 3.5 | 3.5 | 3.5 | 3.5 | 3.5 |
| Agent for preventing heat aging*6 | 3.0 | 3.0 | 3.0 | 3.0 | 3.0 | 1.0 |
| Agent for preventing degradation*7 | 0.0 | 0.0 | 0.0 | 0.0 | 0.0 | 5.0 |
| Sulfur | 5.0 | 5.0 | 5.0 | 5.0 | 5.0 | 5.0 |
| Temperature C (° C.) | 178 | 178 | 178 | 178 | 178 | 174 |
| ΔE'*8(MPa) | 3.0 | 3.0 | 3.0 | 3.0 | 3.0 | 2.5 |
| Applied portion | | | | | | |
| reinforcing rubber | applied | applied | applied | applied | applied | applied |
| bead filler | not applied | not applied | not applied | not applied | not applied | not applied |
| Durability in the run-flat condition | 121 | 119 | 115 | 121 | 119 | 130 |

TABLE 1-3

| Example | 13 | 14 | 15 | 16 | 17 | 18 |
|---|---|---|---|---|---|---|
| Natural rubber | 30.0 | 30.0 | 30.0 | 50.0 | 70.0 | 30.0 |
| Butadiene rubber*1 | 70.0 | 70.0 | 70.0 | 70.0 | 70.0 | 70.0 |
| Carbon black*2 | 60.0 | 60.0 | 60.0 | 60.0 | 60.0 | 60.0 |
| Softener*3 | 5.0 | 5.0 | 5.0 | 5.0 | 5.0 | 5.0 |
| Zinc oxide | 3.0 | 3.0 | 3.0 | 3.0 | 3.0 | 3.0 |
| Stearic acid | 1.0 | 1.0 | 1.0 | 1.0 | 1.0 | 1.0 |
| Antioxidant*4 | 2.0 | 2.0 | 2.0 | 2.0 | 2.0 | 2.0 |
| Vulcanization accelerator*5 | 3.5 | 3.5 | 3.5 | 3.5 | 3.5 | 3.5 |
| Agent for preventing heat aging*6 | 2.0 | 3.0 | 5.0 | 10.0 | 3.0 | 5.0 |
| Agent for preventing degradation*7 | 5.0 | 5.0 | 5.0 | 5.0 | 0.0 | 0.0 |
| Sulfur | 5.0 | 5.0 | 5.0 | 5.0 | 5.0 | 5.0 |
| Temperature C (° C.) | 175 | 178 | 180 | 180 | 178 | 178 |
| ΔE'*8(MPa) | 2.5 | 2.5 | 2.5 | 2.5 | 3.0 | 3.0 |

TABLE 1-3-continued

| Example | 13 | 14 | 15 | 16 | 17 | 18 |
|---|---|---|---|---|---|---|
| Applied portion | | | | | | |
| reinforcing rubber | applied | applied | applied | applied | applied | applied |
| bead filler | not applied | not applied | not applied | not applied | applied | applied |
| Durability in the run-flat condition | 134 | 142 | 154 | 166 | 143 | 150 |

The amounts in the above table are all in parts by weight.
*[1]BR01 (a trade mark; manufactured by JSR Corporation)
*[2]FEF
*[3]Spindle oil
*[4]NOCRAC 6C (a trade mark; manufactured by OUCHI SHINKO KAGAKU KOGYO Co., Ltd.)
*[5]NOCCELOR NS (a trade mark; manufactured by OUCHI SHINKO KAGAKU KOGYO Co., Ltd.)
*[6]Sodium 1,6-hexamethylenedithiosulfate dihydrate
*[7]KAYARAD D310 (a trade mark; manufactured by NIPPON KAYAKU Co., Ltd.)
*[8]Range of the change in storage modulus in the temperature range of 170 to 200° C.

As shown in Table 1, the rubber composition of the present invention comprising the agent for preventing heat aging had, in the curve exhibiting the change in dynamic storage modulus during elevation of temperature, the intersection of the extrapolation line A of the portion in which the dynamic storage modulus shows an approximately linear change before rapidly decreasing at temperatures higher than 100° C. and the extrapolation line B of the portion in which the dynamic storage modulus rapidly decreases, at a temperature of 170° C. or higher independently of the type of the rubber component and the amount of carbon black. In Examples 12 to 16 in which the agent for preventing degradation was used in combination, the change in the dynamic storage modulus with temperature in the temperature range of 170 to 200° C. decreased.

Radial tires having a size 225/60R16 were prepared in accordance with a conventional process using the above rubber compositions as the rubber composition for the rubber reinforcing layers disposed at the side wall portions and were subjected to the durability test. The results are shown in Table 1. In Examples 17 and 18 shown in Table 1, the same rubber compositions were used for the rubber reinforcing layers and for the bead fillers.

As shown by the results in Table 1, durability in the run-flat condition can be improved by using the rubber composition of the present invention as the rubber composition for the rubber reinforcing layers. As shown by the results of Examples 17 and 18, durability of the tire in the run-flat durability can be further improved by using the rubber composition of the present invention as the rubber compositions for the rubber reinforcing layers and for the bead fillers.

Examples 19–24

Rubber compositions were prepared in accordance with the formulations shown in Table 2 and the dynamic storage modulus E' was measured with an elevation of temperature. The results are shown in Table 2.

TABLE 2

| Example Comparative Example | 2 | 19 | 20 | 21 | 22 | 23 | 24 |
|---|---|---|---|---|---|---|---|
| Natural rubber | 30.0 | 30.0 | 30.0 | 30.0 | 30.0 | 30.0 | 30.0 |
| Butadiene rubber*[1] | 70.0 | 70.0 | 70.0 | 70.0 | 70.0 | 70.0 | 70.0 |
| Carbon black*[2] | 60.0 | 60.0 | 60.0 | 60.0 | 60.0 | 60.0 | 70.0 |
| Softener*[3] | 5.0 | 5.0 | 5.0 | 5.0 | 5.0 | 5.0 | 5.0 |
| Zinc oxide | 3.0 | 3.0 | 3.0 | 3.0 | 3.0 | 3.0 | 3.0 |
| Stearic acid | 1.0 | 1.0 | 1.0 | 1.0 | 1.0 | 1.0 | 1.0 |
| Antioxidant*[4] | 2.0 | 2.0 | 2.0 | 2.0 | 2.0 | 2.0 | 2.0 |
| Vulcanization accelerator*[5] | 3.5 | 3.5 | 3.5 | 3.5 | 3.5 | 3.5 | 3.5 |
| Agent for preventing heat aging*[6] | 0.0 | 0.0 | 0.0 | 0.0 | 0.0 | 0.0 | 0.0 |
| Agent for preventing degradation*[7] | 0.0 | 3.0 | 5.0 | 10.0 | 0.0 | 0.0 | 0.0 |
| Agent for preventing degradation B*[8] | 0.0 | 0.0 | 0.0 | 0.0 | 3.0 | 5.0 | 10.0 |
| Sulfur | 5.0 | 5.0 | 5.0 | 5.0 | 5.0 | 5.0 | 5.0 |
| $\Delta E'^{*8}$(MPa) | 2.5 | 1.8 | 1.1 | 0.7 | 2.3 | 1.8 | 1.3 |
| Applied portion | | | | | | | |
| reinforcing rubber | applied | applied | applied | applied | applied | applied | applied |
| bead filler | not applied | not applied | not applied | not applied | not applied | not applied | not applied |

TABLE 2-continued

| Example Comparative Example | 2 | 19 | 20 | 21 | 22 | 23 | 24 |
|---|---|---|---|---|---|---|---|
| Durability in the run-flat condition | 100 | 108 | 125 | 151 | 102 | 108 | 118 |

The amounts in the above table are all in parts by weight.
*¹BR01 (a trade mark; manufactured by JSR Corporation)
*²FEF
*³Spindle oil
*⁴NOCRAC 6C (a trade mark; manufactured by OUCHI SHINKO KAGAKU KOGYO Co., Ltd.)
*⁵NOCCELOR NS (a trade mark; manufactured by OUCHI SHINKO KAGAKU KOGYO Co., Ltd.)
*⁶Sodium 1,6-hexamethylenedithiosulfate dihydrate
*⁷TMPTA (a trade mark; manufactured by NIPPON KAYAKU Co., Ltd.)
*⁸KAYARAD D310 (a trade mark; manufactured by NIPPON KAYAKU Co., Ltd.)
*⁹Difference between max. and min. of storage modulus at a temperature between 180 and 200° C.

As shown in Table 2, the rubber composition of the present invention comprising the agent for preventing degradation had, in the curve exhibiting the change in dynamic storage modulus during elevation of temperature, a difference ΔE' of 2.5 MPa or less (ΔE': a difference between the maximum value and the minimum value of the dynamic storage modulus at a temperature between 180 and 200° C.).

Radial tires having a size 225/60R16 were prepared in accordance with a conventional process using the above rubber compositions as the rubber composition for the rubber reinforcing layers disposed at the side wall portions and were subjected to the durability test. The results are shown in Table 2.

What is claimed is:

1. A rubber composition comprising:
   a rubber component;
   sodium 1,6-hexamethylenedithiosulfate dihydrate, in the amount of 1 to 10 parts by weight per 100 parts of the rubber component; and
   compound A having two or more ester groups in one molecule, in the amount of 0.5 to 20 parts by weight per 100 parts by weight of the rubber component,
   wherein said rubber composition has, in a curve exhibiting a change in dynamic storage modulus during elevation of temperature, an intersection of an extrapolation line A of a portion in which the dynamic storage modulus shows an approximately linear change before a rapid decrease at temperatures higher than 100° C. and an extrapolation line B of a portion in which the dynamic storage modulus rapidly decreases, at a temperature of 170° C. or higher.

2. A rubber composition according to claim 1, wherein the compound A is an acrylate or a methacrylate.

3. A rubber composition according to claim 1, wherein the compound A is a polyfunctional ester of a polyhydric alcohol and acrylic acid or methacrylic acid, and wherein the polyhydric alcohol is at least one compound selected from the group consisting of tetramethylolmethane, trimethylolpropane and polymers of these compounds.

4. A rubber composition according to claim 3, wherein the polyhydric alcohol is trimethylolpropane or a dimer of tetramethylolmethane.

5. A rubber composition comprising:
   a rubber component;
   sodium 1,6-hexamethylenedithiosulfate dihydrate, in the amount of 1 to 10 parts by weight per 100 parts of the rubber component; and
   compound A having two or more ester groups in one molecule, in the amount of 0.5 to 20 parts by weight per 100 parts by weight of the rubber component,
   wherein said rubber composition has, in a curve exhibiting a change in dynamic storage modulus during elevation of temperature, a difference ΔE' between the maximum value and the minimum value of the dynamic storage modulus at a temperature between 180 and 200° C. of 2.5 MPa or less.

6. A rubber composition according to claim 5, wherein the compound A is an acrylate or a methacrylate.

7. A rubber composition according to claim 1, wherein the compound A is a polyfunctional ester of a polyhydric alcohol and acrylic acid or methacrylic acid.

8. A pneumatic tire comprising bead fillers and/or side wall portions reinforced with a rubber reinforcing layer, wherein the rubber reinforcing layer and/or bead fillers comprise a rubber composition comprising sodium 1,6-hexamethylenedi thiosulfate dihydrate in the amount of 1 to 10 parts by weight per 100 parts of the rubber component, and wherein said rubber composition has, in a curve exhibiting a change in dynamic storage modulus during elevation of temperature, an intersection of an extrapolation line A of a portion in which the dynamic storage modulus shows an approximately linear change before a rapid decrease at temperatures higher than 100° C. and an extrapolation line B of a portion in which the dynamic storage modulus rapidly decreases, at a temperature of 170° C. or higher, wherein the side reinforcing layers and/or bead fillers further comprise a rubber composition comprising a compound A having two or more ester groups in one molecule, in the amount of 0.5 to 20 parts by weight per 100 parts by weight of the rubber component.

9. A pneumatic tire comprising bead fillers and/or side wall portions reinforced with a rubber reinforcing layer, wherein the rubber reinforcing layer and/or bead fillers comprise a rubber composition comprising sodium 1,6-hexamethylenedithiosulfate dihydrate in the amount of 1 to 10 parts by weight per 100 parts of the rubber component, and wherein the rubber composition has, in a curve exhibiting a change in dynamic storage modulus during elevation of temperature, a difference ΔE' between the maximum value and the minimum value of the dynamic storage modulus at a temperature between 180 and 200° C. of 2.5 MPa or less and wherein the side reinforcing layers and/or bead fillers further comprise a rubber composition comprising a compound A having two or more ester groups in one molecule, in the amount of 0.5 to 20 parts by weight per 100 parts by weight of the rubber component.

* * * * *